UNITED STATES PATENT OFFICE.

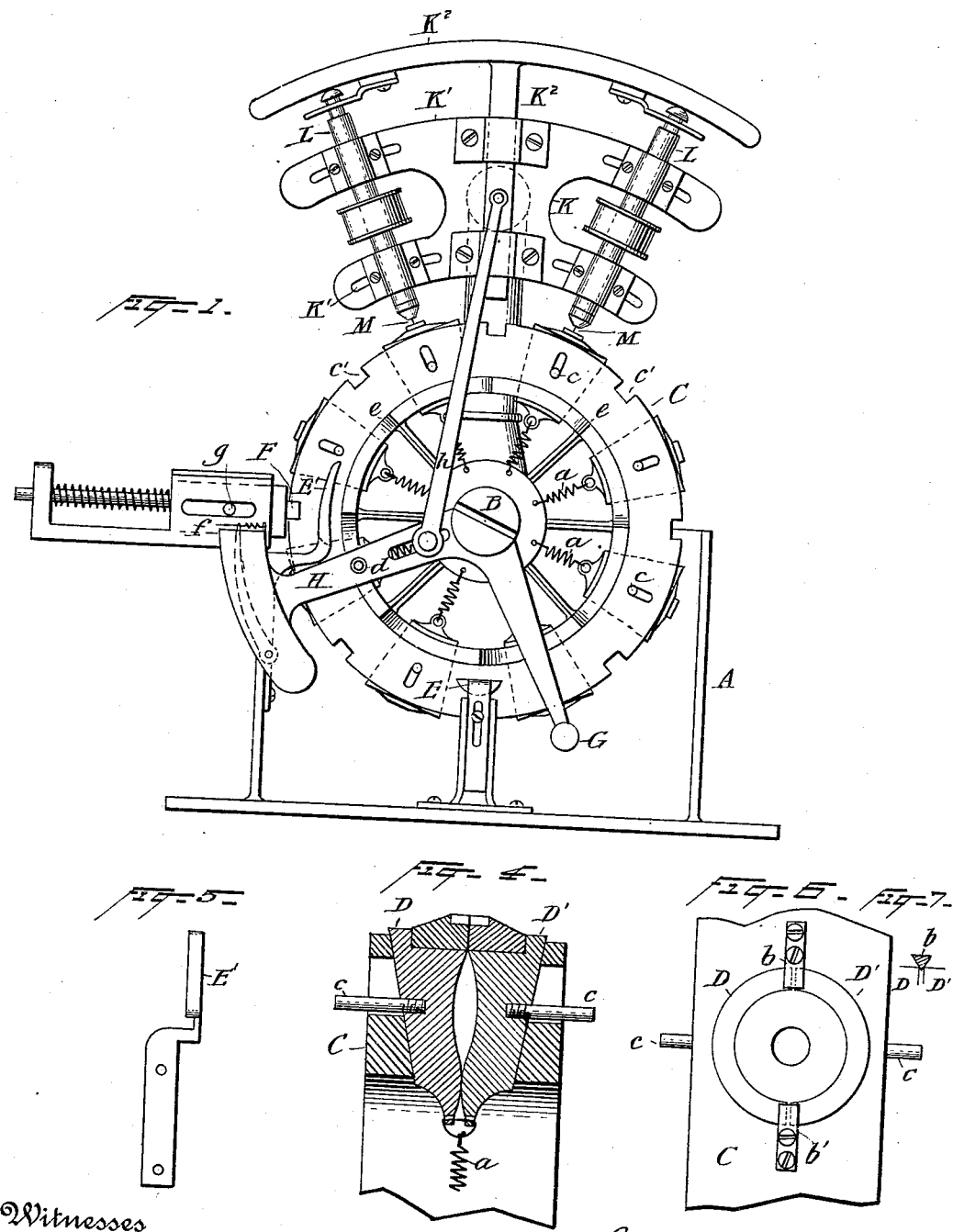

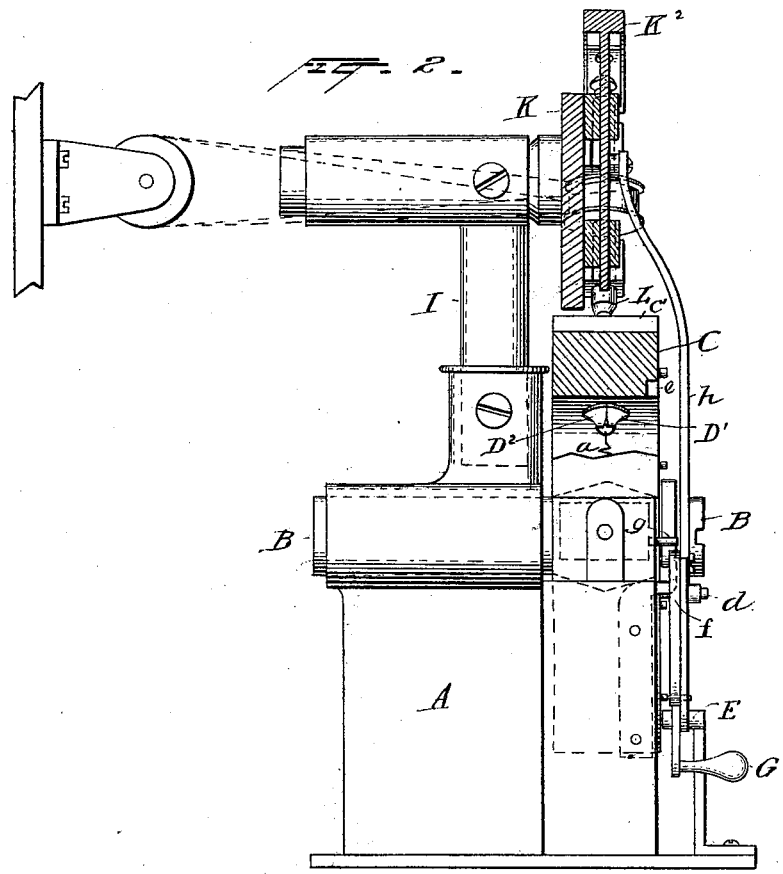

GEORGE CARLYLE, OF DETROIT, MICHIGAN, ASSIGNOR TO HENRY W. CROUSE, TRUSTEE, OF NEW YORK, N. Y.

BUTTON-DRILLING MACHINE.

SPECIFICATION forming part of Letters Patent No. 520,914, dated June 5, 1894.

Application filed December 23, 1892. Serial No. 456,179. (No model.)

*To all whom it may concern:*

Be it known that I, GEORGE CARLYLE, a citizen of the United States, residing at Detroit, in the county of Wayne and State of Michigan, have invented a certain new and useful Improvement in Button-Drilling Machines, of which the following is a specification.

The object I have in view is to produce a machine more particularly designed for drilling holes in buttons, especially those made from mother-of-pearl, which machine will be accurate and effective in operation and will permit of the drilling of a large number of buttons per day by a single unskilled operator.

In carrying out my invention, I mount a series of spring-closed chucks radially in the rim of a wheel mounted upon a horizontal axis, and over this wheel is a sliding frame carrying two or more rotating chuck spindles, which are provided with rotating drilling tools or awls. One of such spindles may be provided with a centering tool, as will be understood. The chuck-carrying wheel is held in each position of rest by a locking dog. An operating arm is swung upon the shaft of the wheel and rotates the wheel by a pawl and ratchet connected therewith, and also withdraws the locking dog just before starting the wheel and releases such dog after the wheel is started, so that the locking dog can drop into the next notch. Cams are provided for opening the chucks to discharge the buttons and to receive fresh blanks.

In the accompanying drawings forming a part hereof, Figure 1 is a front view of the machine. Fig. 2 is a side elevation and partial vertical section of the same. Fig. 3 is a top view of the frame. Fig. 4 is a section of one of the chucks. Fig. 5 is a side view of the cam for opening the chucks to receive new blanks. Fig. 6 is a face view of one of the chucks, showing the opening wedges; and Fig. 7 is a sectional view, showing the action of the opening wedges.

A is the frame of the machine, upon which a horizontal shaft B, carrying the chuck wheel C, is mounted. This wheel has a solid rim, and a hub upon which the rim is supported by spokes, as shown. The rim is bored with a number of tapered radial openings, in each of which are mounted the two tapered chuck jaws D, D', having their inner ends projecting through the rim and connected with the hub by springs $a$, which draw the chuck jaws inwardly and by reason of the tapered openings close such chuck jaws. Wedges $b$, $b'$ secured to the rim of the wheel and presenting their edges to the opening between the chuck jaws of each set force the jaws apart and open the chuck when the jaws are pushed out of the tapered opening. Pins $c$ project from the chuck jaws through slots in the sides of the rim, and with these pins engage cams E, E' which open the chuck jaws. The cams E are placed to open each chuck as the chuck reaches the lowermost point of the wheel, so as to release the button and permit the chuck to clear itself of any dirt which may come from the drilling operation. The cams E' have a considerable length, and again open each chuck as it rises above the horizontal line, so that the operator can place a button blank in the open chuck and hold it there until, by the further rotation of the wheel, the chuck leaves these cams and closes upon the blank. It will be understood that although only one of each set of cams E, and E' is shown there are cams similar to E and E' on the other side of the wheel, so as to act on the pins $c$ of both chuck jaws D, D' simultaneously. The periphery of the wheel C is provided with a series of notches $c'$, one for each chuck, and a spring dog F engages with these notches in succession and locks the wheel at the successive points of rest.

G is an operating handle which is swung on the shaft B outside of the wheel. It is provided with an arm H, which carries a spring dog $d$ engaging with ratchet teeth $e$ on the side of the wheel. These ratchet teeth correspond in number with the chucks, and each movement of the arm from the right to the left produces, through the pawl and ratchet, a movement of the wheel equal to the distance between two of the chucks. The arm H carries on its end a spring tongue $f$ which engages with the pin $g$ on the locking dog, striking such pin and retracting the locking dog on the forward movement of the arm, but permitting such pin to pass back of the tongue on the return movement of the arm.

Rising from the frame A is a standard I, upon which is mounted a stationary face plate K. This plate is constructed to form two concentrically curved wings K', through bearings in which slide spindles L, rotated by suitable power connections as shown. These spindles are moved by a sliding T-shaped frame K² to which they are connected at their upper ends. The spindle bearings are adjustably mounted upon the wings K', whereby the spindles can be adjusted for drilling holes in buttons of different size. The spindles L carry rotating drilling tools or awls M. It is evident that there may be more than two of these spindles, and that one of such spindles may carry a centering tool. The drills M operate simultaneously upon the blanks held by two separate chucks, and each blank, as will be understood, is operated upon successively by the drills. The sliding frame K² is connected by a link $h$ with the arm H, so that the movement of the operating handle will raise and lower the drills.

The operation of the machine will be understood from the foregoing description. When the operating handle is swung to the left, the drill frame is first raised, the dog is then released, and the wheel is rotated from one position to the next. The operating handle is then swung to the right, depressing the drill frame and causing the rotating drills to pierce the button-blanks in position beneath them. Before each movement of the handle to the left, a new button-blank is placed in the chuck to be advanced under the first drill. The drilled buttons are discharged at the bottom of the machine into any suitable receptacle.

What I claim is—

1. In a button-drilling machine, the combination with a rotating wheel having a series of chucks mounted radially in its rim, of an arm a pawl and ratchet connection betwe said arm and wheel whereby the wheel is rotated, and a sliding drill frame carrying a plurality of rotating drill spindles and reciprocated by a connection with such operating arm, substantially as set forth.

2. In a button-drilling machine, the combination with the rotating wheel carrying a series of chucks mounted radially in its rim, of a locking dog for holding such wheel, a sliding drill frame carrying a plurality of rotating drills, an operating arm a pawl and ratchet connection between said arm and wheel whereby the wheel is rotated, a connection between such arm and the sliding drill frame for working such drill frame, and a tongue carried by such arm for retracting the locking dog, substantially as set forth.

3. In a button-drilling machine, the combination of a rotary wheel, a series of tapering holes located radially in the rim of said wheel, tapering chuck-jaws in said holes, wedges on said wheel in proximity to said jaws, stationary cams for forcing said jaws outward against said wedges to open the chucks as the wheel rotates, and springs for returning said jaws to their normal position, substantially as set forth.

4. In a button-drilling machine, the combination with a chuck carrying wheel, of sliding chuck-jaws carried in openings in said wheel, stationary wedges on said wheel in proximity to said jaws, and means for forcing said jaws against said wedges to open the jaws, substantially as set forth.

This specification signed and witnessed this 3d day of December, 1892.

GEORGE CARLYLE.

Witnesses:
EUGENE CONRAN,
GEORGE B. CRONK.